United States Patent
Wei

(10) Patent No.: US 10,235,889 B2
(45) Date of Patent: Mar. 19, 2019

(54) METHOD, APPARATUS AND SYSTEM FOR MONITORING VEHICLE DRIVING SAFETY

(71) Applicant: BEIJING QIHOO TECHNOLOGY COMPANY LIMITED, Beijing (CN)

(72) Inventor: Dangwei Wei, Beijing (CN)

(73) Assignee: Beijing Qihoo Technology Limited, Beijing (CN)

( * ) Notice: Subject to any disclaimer, the term of this patent is extended or adjusted under 35 U.S.C. 154(b) by 0 days.

(21) Appl. No.: 15/744,714

(22) PCT Filed: Dec. 24, 2015

(86) PCT No.: PCT/CN2015/098751
§ 371 (c)(1),
(2) Date: Jan. 12, 2018

(87) PCT Pub. No.: WO2017/080039
PCT Pub. Date: May 18, 2017

(65) Prior Publication Data
US 2018/0211543 A1     Jul. 26, 2018

(30) Foreign Application Priority Data

Nov. 9, 2015 (CN) .......................... 2015 1 0754019

(51) Int. Cl.
*G08G 1/00* (2006.01)
*G08B 25/00* (2006.01)
(Continued)

(52) U.S. Cl.
CPC ......... *G08G 1/205* (2013.01); *G06K 9/00832* (2013.01); *G06Q 10/02* (2013.01);
(Continued)

(58) Field of Classification Search
CPC ........ G08G 1/166; G08G 1/202; G08G 1/205; G06Q 10/02; G06Q 10/0833; G06Q 50/30;
(Continued)

(56) References Cited

U.S. PATENT DOCUMENTS

| | | | | |
|---|---|---|---|---|
| 2003/0210806 A1* | 11/2003 | Yoichi | ................ | G01C 21/3647 382/104 |
| 2003/0212567 A1* | 11/2003 | Shintani | ................ | G06Q 99/00 725/105 |
| 2012/0041675 A1* | 2/2012 | Juliver | ................... | G06Q 10/08 701/465 |
| 2012/0109721 A1* | 5/2012 | Cebon | .................... | G06Q 30/06 705/13 |

(Continued)

FOREIGN PATENT DOCUMENTS

| | | |
|---|---|---|
| CN | 1417065 A | 5/2003 |
| CN | 101178836 A | 5/2008 |

(Continued)

OTHER PUBLICATIONS

International Patent Application No. PCT/CN2015/098751; Int'l Search Report; dated Aug. 4, 2016; 3 pages.

*Primary Examiner* — Orlando Bousono
(74) *Attorney, Agent, or Firm* — Baker & Hostetler LLP

(57) ABSTRACT

The present invention discloses a method, apparatus and system for monitoring vehicle driving safety. The method comprises: determining a vehicle driving route range between the originating address and the destination address and a reasonable time range for arriving at the destination address; when a location of the vehicle goes beyond the vehicle driving route range or the vehicle driving time exceeds the reasonable time range according to driving data of the vehicle, sending an in-vehicle image acquisition instruction to the vehicle-mounted smart device, such that (Continued)

the vehicle-mounted smart device acquires and sends in-vehicle image information to the taxi-hailing server; comparing in-vehicle image information acquired twice by the vehicle-mounted smart device after responding to the taxi-hailing request and when a passenger gets on; and sending alarm information to a safety monitoring server to notify a traffic policeman nearby the vehicle to inspect or monitor the vehicle.

16 Claims, 4 Drawing Sheets

(51) Int. Cl.
    *G06K 9/00*     (2006.01)
    *G08B 25/10*     (2006.01)
    *G06Q 10/02*     (2012.01)
    *G06Q 10/08*     (2012.01)
    *G06Q 50/30*     (2012.01)

(52) U.S. Cl.
    CPC ......... *G06Q 10/0833* (2013.01); *G06Q 50/30* (2013.01); *G08B 25/00* (2013.01); *G08B 25/10* (2013.01); *G08G 1/202* (2013.01)

(58) Field of Classification Search
    CPC ........... G06Q 30/0265; G06K 9/00832; G08B 25/10; G07C 5/008; H04N 7/181
    See application file for complete search history.

(56) References Cited

U.S. PATENT DOCUMENTS

| | | | |
|---|---|---|---|
| 2012/0150427 | A1 | 6/2012 | Jeong et al. |
| 2014/0067156 | A1* | 3/2014 | Gehlen .................... G08G 1/01 701/1 |
| 2014/0111647 | A1* | 4/2014 | Atsnnon ................ H04N 7/185 348/148 |
| 2015/0081362 | A1 | 3/2015 | Chadwick et al. |
| 2015/0339928 | A1* | 11/2015 | Ramanujam ........... G08G 1/202 701/23 |
| 2016/0364678 | A1* | 12/2016 | Cao ........................ G06Q 50/30 |
| 2016/0364812 | A1* | 12/2016 | Cao ........................ G06Q 50/01 |
| 2016/0364823 | A1* | 12/2016 | Cao ........................ G06Q 50/30 |

FOREIGN PATENT DOCUMENTS

| | | |
|---|---|---|
| CN | 103544820 A | 1/2014 |
| CN | 103942972 A | 7/2014 |
| CN | 104021656 A | 9/2014 |
| CN | 104464356 A | 3/2015 |
| CN | 104599496 A | 5/2015 |
| CN | 104916122 A | 9/2015 |
| KR | 2004-0063245 A | 7/2004 |
| KR | 2008-0045101 A | 5/2008 |
| KR | 10-0899766 B1 | 5/2009 |
| TW | I258592 B | 7/2006 |

* cited by examiner

METHOD, APPARATUS AND SYSTEM FOR MONITORING VEHICLE DRIVING SAFETY

CROSS-REFERENCE TO RELATED APPLICATIONS

This application is the national stage of International Application No. PCT/CN2015/098751 filed Dec. 24, 2015, which claims the benefit of Chinese Patent Applications No. CN201510754019.X, filed Nov. 9, 2015, the entirety of which are incorporated herein by reference.

FIELD OF TECHNOLOGY

The present invention pertains to the field of vehicle driving safety, and specifically to a method, an apparatus and a system for monitoring vehicle driving safety.

BACKGROUND

As well-known vehicles, taxies play an important role in urban transport. Traditional taxies mainly are taxies hailed by passengers at the roadside. However, the traditional mode of carrying passengers by taxies is a blind cruising mode. That is, taxi drivers blindly drive based on experiences and feelings, which not only results in low efficiency and high cost, but also causes waste of resources, pollutes the environment and aggravates labor intensity of the taxi drivers.

At present, with the development of communication and Internet technologies, the online taxi-hailing service has drawn wide attention and has been widely used. However, criminals frequently use vehicles to flee around to commit crimes, threatening safety of drivers or passengers.

Thanks to popularization and flourishing development of the global positioning system (GPS), many taxies are equipped with the global positioning systems to provide positioning and navigation services. Therefore, a variety of global positioning systems are naturally used to monitor taxies. However, this mode requires a large amount of manpower for monitoring and determination, is impossible to know in-vehicle statuses in real time, and still has a problem of safety.

SUMMARY

In view of this, this application provides a method, an apparatus, and a system for monitoring vehicle driving safety, which are intended to solve a problem that it is impossible to improve a safety of a passenger in taking a taxi.

To solve the above technical problem, in a first aspect, this application discloses a method for monitoring vehicle driving safety, comprising:
  determining, by a taxi-hailing server according to an originating address and a destination address comprised in a taxi-hailing request, a vehicle driving route range between the originating address and the destination address and a reasonable time range for arriving at the destination address;
  when it is determined that a location of the vehicle has gone beyond the vehicle driving route range or that the vehicle driving time has exceeded the reasonable time range according to driving data of the vehicle sent from a vehicle-mounted smart device, sending an in-vehicle image acquisition instruction to the vehicle-mounted smart device, such that the vehicle-mounted smart device acquires and sends in-vehicle image information to the taxi-hailing server;
  comparing in-vehicle image information acquired twice according to the in-vehicle image information acquired by the vehicle-mounted smart device after responding to the taxi-hailing request and when a passenger gets on; and
  when it is determined that a danger index has reached a preset alarm threshold according to a comparison result, sending alarm information and the driving data of the vehicle to a safety monitoring server, such that the safety monitoring server performs electronic positioning and tracking on the vehicle via an electronic map according to the alarm information and the driving data of the vehicle to notify a traffic policeman nearby the vehicle to monitor the vehicle.

In a second aspect, an embodiment of the present invention further provides a method for monitoring vehicle driving safety, comprising:
  after a vehicle-mounted smart device makes a taxi-hailing response to a taxi-hailing request sent from a user equipment, sending the taxi-hailing response to a taxi-hailing server;
  acquiring, by the vehicle-mounted smart device, in-vehicle image information, obtained when a passenger gets on, corresponding to the taxi-hailing request, and sending the in-vehicle image information to the taxi-hailing server, the in-vehicle image information comprises image information of a location where a driver is and image information of a location where the passenger is;
  acquiring and sending driving data of the vehicle to the taxi-hailing server by the vehicle-mounted smart device, the driving data of the vehicle comprising road driving information of the vehicle, driving direction information of the vehicle, and location information of the vehicle, such that the taxi-hailing server determines, according to an originating address and a destination address comprised in the taxi-hailing request, a vehicle driving route range between the originating address and the destination address and a reasonable time range for arriving at the destination address; when it is determined that a location of the vehicle has gone beyond the vehicle driving route range or that the vehicle driving time has exceeded the reasonable time range according to the driving data of the vehicle sent from the vehicle-mounted smart device, sending an in-vehicle image acquisition instruction to the vehicle-mounted smart device;
  acquiring the in-vehicle image information according to the in-vehicle image acquisition instruction and sending the same to the taxi-hailing server by the vehicle-mounted smart device, such that the taxi-hailing server compares in-vehicle image information acquired twice; and when it is determined that a danger index has reached a preset alarm threshold according to a comparison result, sending alarm information and the driving data of the vehicle to the safety monitoring server, such that the safety monitoring server performs electronic positioning and tracking on the vehicle via an electronic map according to the alarm information and the driving data of the vehicle to notify a traffic policeman nearby the vehicle to monitor the vehicle.

In a third aspect, an embodiment of the present invention further provides an apparatus for monitoring vehicle driving safety, positioned at a side of a taxi-hailing server, and comprising:

a first determining module, configured to determine, according to an originating address and a destination address comprised in a taxi-hailing request, a vehicle driving route range between the originating address and the destination address and a reasonable time range for arriving at the destination address;

a second determining module, configured to determine, according to driving data of the vehicle sent from a vehicle-mounted smart device, that a location of the vehicle has gone beyond the vehicle driving route range or that the vehicle driving time has exceeded the reasonable time range;

a sending module, configured to send an in-vehicle image acquisition instruction to the vehicle-mounted smart device, such that the vehicle-mounted smart device acquires and sends in-vehicle image information to the taxi-hailing server;

a comparing module, configured to compare in-vehicle image information acquired twice according to the in-vehicle image information acquired by the vehicle-mounted smart device after responding to the taxi-hailing request and when a passenger gets on; and a third determining module, configured to determine that a danger index has reached a preset alarm threshold according to a comparison result obtained by the comparing module, and send, via the sending module, alarm information and the driving data of the vehicle to a safety monitoring server, such that the safety monitoring server performs electronic positioning and tracking on the vehicle via an electronic map according to the alarm information and the driving data of the vehicle to notify a traffic policeman nearby the vehicle to inspect or monitor the vehicle.

In a fourth aspect, an embodiment of the present invention further provides an apparatus for monitoring vehicle driving safety, positioned at a side of a vehicle-mounted smart device, and comprising:

a sending module, configured to send, after making a taxi-hailing response to a taxi-hailing request sent from a user equipment, the taxi-hailing response to a taxi-hailing server; and an acquiring module, configured to acquire in-vehicle image information, obtained when a passenger gets on, corresponding to the taxi-hailing request, and send, via the sending module, the in-vehicle image information to the taxi-hailing server, the in-vehicle image information comprising image information of a location where a driver is and image information of a location where the passenger is.

The acquiring module is further configured to acquire and send driving data of the vehicle to the taxi-hailing server, the driving data of the vehicle comprising road driving information of the vehicle, driving direction information of the vehicle, and location information of the vehicle, such that the taxi-hailing server determines, according to an originating address and a destination address comprised in the taxi-hailing request, a vehicle driving route range between the originating address and the destination address and a reasonable time range for arriving at the destination address; and send, when it is determined that a location of the vehicle has gone beyond the vehicle driving route range or that the vehicle driving time has exceeded the reasonable time range according to the driving data of the vehicle sent from the vehicle-mounted smart device, an in-vehicle image acquisition instruction to the vehicle-mounted smart device.

The acquiring module is further configured to acquire the in-vehicle image information according to the in-vehicle image acquisition instruction and send the same to the taxi-hailing server, such that the taxi-hailing server compares in-vehicle image information acquired twice; and when it is determined that a danger index has reached a preset alarm threshold according to a comparison result, send alarm information and the driving data of the vehicle to the safety monitoring server, such that the safety monitoring server performs electronic positioning and tracking on the vehicle via an electronic map according to the alarm information and the driving data of the vehicle to notify a traffic policeman nearby the vehicle to inspect or monitor the vehicle.

In a fifth aspect, an embodiment of the present invention further provides a system for monitoring vehicle driving safety, comprising: a taxi-hailing server, a vehicle-mounted smart device, and a safety monitoring server.

The taxi-hailing server comprises the apparatus for monitoring vehicle driving safety according to the third aspect.

The vehicle-mounted smart device comprises the apparatus for monitoring vehicle driving safety according to the fourth aspect.

The safety monitoring server is configured to receive the alarm information and the driving data of the vehicle sent from the taxi-hailing server, and perform electronic positioning and tracking on the vehicle via the electronic map according to the alarm information and the driving data of the vehicle to notify the traffic policeman nearby the vehicle to inspect or monitor the vehicle.

According to a sixth aspect of the present invention, there is provided a computer program, which comprises a computer-readable code. When the computer-readable code runs on a computing device, the computing device is caused to execute the above method for monitoring vehicle driving safety.

According to a seventh aspect of the present invention, there is provided a computer-readable medium, in which the above computer program is stored.

The vehicle-mounted smart device of the present invention just acquires in-vehicle image information when a passenger gets on, and then sends an instruction for acquiring in-vehicle image information again to the vehicle-mounted smart device only when the taxi-hailing server determines that the danger index is higher. It is not required to acquire in-vehicle image information in real time, which neither is suspected of infringement of privacy of the passenger nor sends a great deal of image information to the taxi-hailing server, thereby greatly reducing memory stress of the taxi-hailing server.

Meanwhile, the taxi-hailing server in the present invention may calculate, according to an originating address and a destination address in a taxi-hailing request, multiple reasonable vehicle driving routes (vehicle driving route range) between the originating address and the destination address, and may also calculate a reasonable time range from the originating address to the destination address. Only when it is determined that a road where the vehicle currently is, a driving direction or a location obtained via a GPS has gone beyond the vehicle driving route range or that the vehicle driving time has exceeded the reasonable time range, i.e., only when it is determined that an in-vehicle danger index is higher, is it started again to acquire the in-vehicle image information. Thus the determination is relatively scientific and reasonable.

Further, the alarm information and the driving data of the vehicle are sent to the safety monitoring server only when it is compared the in-vehicle image information acquired twice and it is determined that a danger index has exceeded a preset alarm threshold (for example, it may be considered that there is a high probability of occurrence of a safety accident when the in-vehicle image acquired for the first time shows that it is clean and tidy in the vehicle but the in-vehicle image acquired for the second time shows that it is messy in the vehicle) according to a comparison result, electronic positioning and tracking are performed on the vehicle via an electronic map, and a traffic policeman nearby the vehicle is notified to intercept or inspect the vehicle. Therefore, it is not easy to cause a false alarm, and thus a probability of false alarm is reduced.

Further, after the passenger gets on, in case the taxi-hailing server fails to determine that the in-vehicle danger index is higher and thus an instruction for acquiring in-vehicle image information is not started again, a driver may trigger an alarm via a preset alarm button in the vehicle-mounted smart device or a passenger may trigger an alarm via a preset alarm button in a hand-held user equipment when a safety accident occurs in the vehicle, for example, the driver assaults the passenger or the passenger assaults the driver. In the present invention, the alarm information triggered by the vehicle-mounted smart device or the user equipment either may be sent to the taxi-hailing server and then is sent to the safety monitoring server via the taxi-hailing server, or may be directly sent to the safety monitoring server, such that the safety monitoring server performs electronic positioning and tracking on the vehicle via an electronic map according to the alarm information and the driving data of the vehicle and notifies a traffic policeman nearby the vehicle to monitor or inspect the vehicle. In this way, the safety accident may be timely monitored and prevented.

Further, in the present invention, the safety of the identification of the user equipment and corresponding user information thereof is authenticated via the safety monitoring server according to the identification (for example, a mobile phone number, which generally is subject to real-name registration) of the user equipment initiating the taxi-hailing request. For example, the mobile phone number belongs to a sensitive area, or the user information corresponding to the mobile phone number belongs to a sensitive area, or a user to whom the mobile phone number belongs frequently changes mobile phone numbers, or the mobile phone number has been used for illegal transaction, or the user to whom the mobile phone number belongs has ever been engaged in illegal activities, and so on. When the safety monitoring server determines that the danger index of the identification information of the user equipment or of the passenger identity information has reached the preset monitoring threshold, the safety monitoring server sends the in-vehicle image acquisition instruction to the vehicle-mounted smart device, such that the vehicle-mounted smart device acquires in-vehicle image information again according to the in-vehicle image acquisition instruction, and sends the interior image information to the safety monitoring server to perform further safety monitoring. Meanwhile, a danger vibration prompt may also be provided to the driver via the vehicle-mounted smart device, which not only can avoid false alarm of danger information but also can prevent occurrence of a safety accident in advance.

BRIEF DESCRIPTION OF THE DRAWINGS

The accompanying drawings described herein are intended for providing further understanding of the present application, and constituting a part of the present application. The exemplary embodiments of the present application and description thereof are intended for explaining the present application, and not for constituting an improper limitation on the present application. In the accompanying drawings.

DESCRIPTION OF THE EMBODIMENTS

Figure 1:
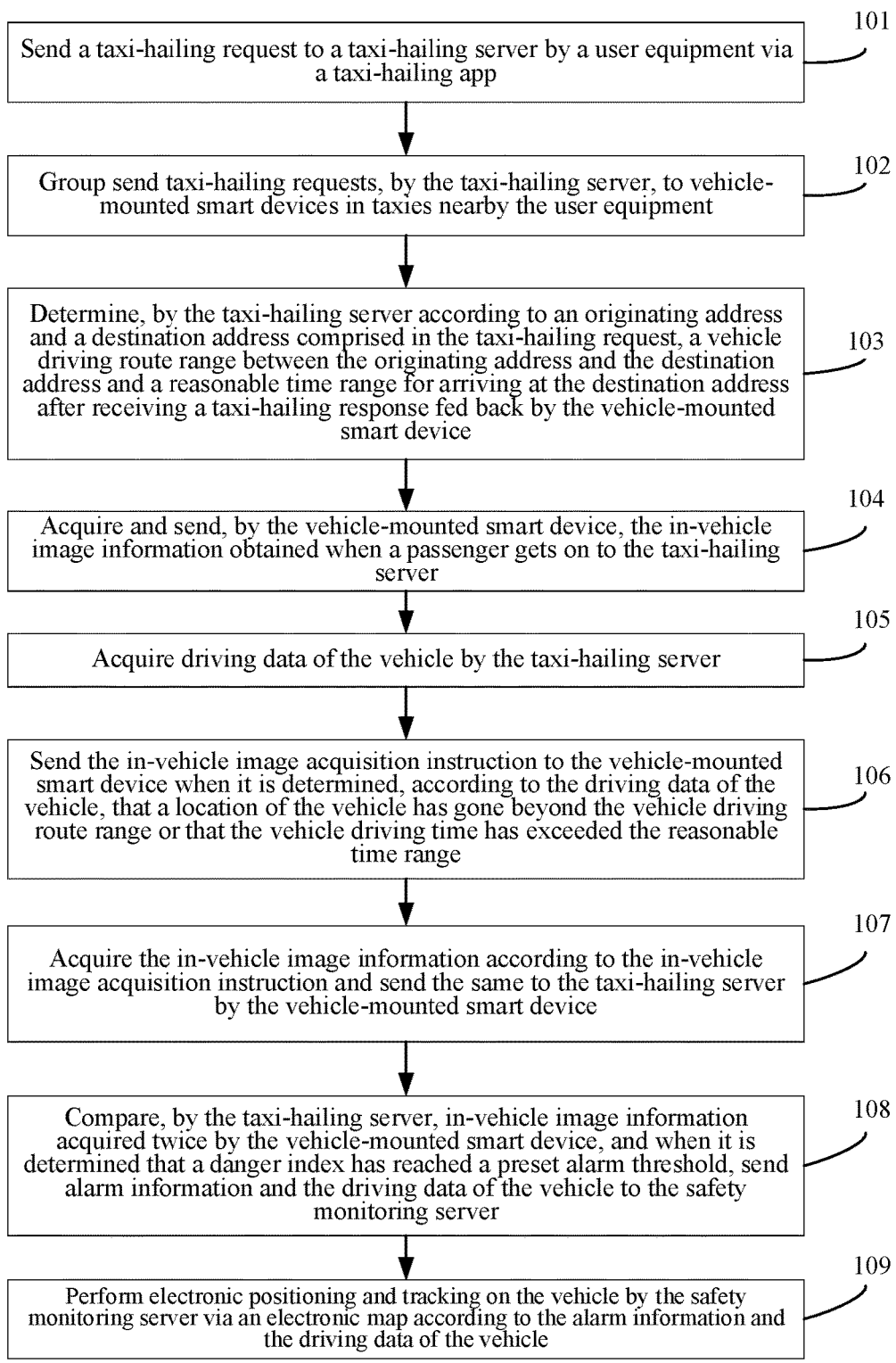
FIG. 1 is a schematic flowchart of a method for monitoring vehicle driving safety according to an embodiment of this application.

Exemplary implementations of the present invention will be explained in detail with reference to the accompanying drawings and the embodiments, whereby it can be fully understood how to solve the technical problem by the technical means according to the present invention and achieve the technical effects thereof, and thus the embodiments according to the present invention can be implemented.

In a typical configuration, a computing device comprises one or more CPUs, input-output interfaces, network interfaces and memories.

A memory may comprise a volatile memory in a computer-readable medium, a random access memory (RAM) and/or a non-volatile memory, such as a read-only memory (ROM) or a flash RAM. A memory is an example of a computer-readable medium.

A computer-readable medium comprises a non-volatile medium, a volatile medium, a mobile medium or an immobile medium, which may implement information storage by means of any method or technology. Information may be a computer-readable instruction, a data structure, a module of a program, or other data. Examples of computer storage media comprise but are not limited to a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical memories, a cartridge magnetic tape, a magnetic tape or magnetic disk memory or other magnetic storage devices or any other non-transmission media, which may be configured to store information that can be accessed by a computing device. As defined herein, computer-readable media do not comprise transitory media, for example, modulated data signals and carriers.

Certain terms are used throughout the descriptions and claims to refer to particular components. As one skilled in the art will appreciate, hardware manufacturers may refer to a component by different names. The descriptions and claims do not intend to distinguish between components that differ in name but distinguish between components that differ in functionality. For example, throughout the descriptions and claims, the term "comprise" or "comprising" is used in an open-ended fashion, and thus should be interpreted to mean "including, but not limited to". "Substantially" means that those skilled in the art, within an acceptable error range, can solve the technical problems within a certain error range, and basically achieve the technical effects. Moreover, the term "couple" or "coupled" herein comprises either a direct or an indirect electrical coupling means. Thus, when a first apparatus couples to a second apparatus, this indicates that the first apparatus may be directly electrically coupled to the second apparatus or indirectly electrically coupled to the second apparatus via other apparatuses or coupling means. The subsequent description is a preferred embodiment for carrying out the present invention. However, the description is made merely for the purpose of illustrating the general principles of the present invention, but is not intended to limit the scope of the present invention. The protection scope of the present invention shall be subject to the protection scope defined by the claims.

Furthermore, it is to be noted that terms such as "comprise", "comprising" or other variants thereof are intended to cover a non-exclusive "comprise" such that a merchandise or a system comprising a series of elements not only comprises these elements, but also comprises other elements not listed explicitly, or also comprises inherent elements of the merchandise or the system. In the case of no more restrictions, elements restricted by a sentence "comprise a . . . " do not exclude the fact that additional identical elements may exist in a merchandise or a system of these elements.

To improve the operation safety of a taxi, in the prior art, generally the taxi is equipped with a device with a photographing function to transfer an in-vehicle video image to a remote server, such that the remote server browses the received in-vehicle video image to determine the operation safety of the taxi. However, in this way, when each taxi transfers an in-vehicle video image to the remote server, it is suspected of infringement of privacy of passengers. Furthermore, large stress of storage space may be caused to the server in order to receive and store a large number of video images. Moreover, it is still impossible to effectively save artificial monitoring and determination time although in-vehicle statuses can be known in this way. Even though a safety accident such as a driver being hijacked by a passenger or the passenger being hijacked by the driver really occurs in the taxi, the server cannot timely give an alarm or provide a safety precaution. Instead, the server can only store the received in-vehicle video images as evidence. Therefore, the safety problem is not really solved, and it is impossible to really prevent occurrence of a safety accident in the taxi.

To improve the operation safety of a taxi and prevent occurrence of a safety accident in the taxi, in the present invention, when the user equipment sends a taxi-hailing request, according to an originating address and a destination address comprised in the taxi-hailing request, a vehicle driving route range between the originating address and the destination address and a reasonable time range for arriving at the destination address are calculated out in advance. After a vehicle-mounted smart device on the taxi responds to the taxi-hailing request and when it is detected that the passenger making the taxi-hailing request gets on, in-vehicle image information obtained when the passenger gets on is acquired and sent to a taxi-hailing server. During driving, the vehicle-mounted smart device may obtain driving data of the vehicle according to a GPS, comprising road driving information of the vehicle, driving direction information of the vehicle, and location information of the vehicle or the like. When the taxi-hailing server determines, according to the driving data of the vehicle, that the location of the vehicle has gone beyond the vehicle driving route range or that the vehicle driving time has exceeded the reasonable time range, a safety accident may likely happen. The taxi-hailing server sends an in-vehicle image acquisition instruction to the vehicle-mounted smart device, such that the vehicle-mounted smart device acquires in-vehicle image information according to the instruction and sends the in-vehicle image information to the taxi-hailing server. The taxi-hailing server compares the in-vehicle image information acquired twice. A danger index is calculated according to a comparison result. When it is determined that the danger index has reached a preset alarm threshold, alarm information and the driving data of the vehicle are sent to a safety monitoring server (for example, a safety monitoring server of a public security system), such that the safety monitoring server performs electronic positioning and tracking on the vehicle via an electronic map according to the alarm information and the driving data of the vehicle and notifies a traffic policeman nearby the vehicle to intercept or inspect the vehicle.

Therefore, the vehicle-mounted smart device of the present invention just acquires in-vehicle image information when a passenger gets on, and then sends an instruction for acquiring the in-vehicle image information again to the vehicle-mounted smart device only when the taxi-hailing server determines that the danger index is higher. It is not required to acquire the in-vehicle image information in real time, which neither is suspected of infringement of privacy of the passenger nor sends a great deal of image information to the taxi-hailing server, thereby greatly reducing memory stress of the taxi-hailing server.

Meanwhile, the taxi-hailing server in the present invention may calculate, according to an originating address and a destination address in a taxi-hailing request, multiple reasonable vehicle driving routes (vehicle driving route range) between the originating address and the destination address, and may also calculate a reasonable time range from the originating address to the destination address. Only when it is determined that a road where the vehicle currently is, a driving direction or a location obtained via a GPS has gone beyond the vehicle driving route range or that the vehicle driving time has exceeded the reasonable time range, i.e., only when it is determined that an in-vehicle danger index is higher, is it started again to acquire the in-vehicle image information. Thus the determination is relatively scientific and reasonable.

Further, the alarm information and the driving data of the vehicle are not sent to the safety monitoring server unless it is compared the in-vehicle image information acquired twice and it is determined that a danger index has exceeded a preset alarm threshold (for example, it may be considered that there is a high probability of occurrence of a safety accident when the in-vehicle image acquired for the first time shows that it is clean and tidy in the vehicle but the in-vehicle image acquired for the second time shows that it is messy in the vehicle) according to a comparison result, electronic positioning and tracking are performed on the vehicle via an electronic map, and a traffic policeman nearby the vehicle is notified to intercept or inspect the vehicle. Therefore, it is not easy to cause a false alarm, and thus a probability of false alarm is reduced.

Further, after the passenger gets on, in case the taxi-hailing server fails to determine that the in-vehicle danger index is higher and thus an instruction for acquiring in-vehicle image information is not started again, a driver may trigger an alarm via a preset alarm button in the vehicle-mounted smart device or a passenger may trigger an alarm via a preset alarm button in a hand-held user equipment when a safety accident occurs in the vehicle, for example, the driver assaults the passenger or the passenger assaults the driver. In the present invention, the alarm information triggered by the vehicle-mounted smart device or the user equipment either may be sent to the taxi-hailing server and then is sent to the safety monitoring server via the taxi-hailing server, or may be directly sent to the safety monitoring server, such that the safety monitoring server performs electronic positioning and tracking on the vehicle via an electronic map according to the alarm information and the driving data of the vehicle and notifies a traffic policeman nearby the vehicle to monitor or inspect the vehicle. In this way, the safety accident may be timely monitored and prevented.

Further, in the present invention, the safety of the identification of the user equipment and corresponding user information thereof is authenticated via the safety monitoring server according to the identification (for example, a mobile phone number, which generally is subject to real-name registration) of the user equipment initiating the taxi-hailing request. For example, the mobile phone number belongs to a sensitive area, or the user information corresponding to the mobile phone number belongs to a sensitive area, or a user to whom the mobile phone number belongs frequently changes mobile phone numbers, or the mobile phone number has been used for illegal transaction, or the user to whom the mobile phone number belongs has ever been engaged in illegal activities, and so on. When the safety monitoring server determines that the danger index of the identification information of the user equipment or of the passenger identity information has reached the preset monitoring threshold, the safety monitoring server sends the in-vehicle image acquisition instruction to the vehicle-mounted smart device, such that the vehicle-mounted smart device acquires the in-vehicle image information again according to the in-vehicle image acquisition instruction, and sends the interior image information to the safety monitoring server to perform further safety monitoring. Meanwhile, a danger vibration prompt may also be provided to the driver via the vehicle-mounted smart device, which not only can avoid false alarm of danger information but also can prevent occurrence of a safety accident in advance.

The technical solution of the present invention is described in detail below with reference to specific embodiments.

FIG. 1 is a schematic flowchart of a method for monitoring vehicle driving safety according to an embodiment of this application. As shown in FIG. 1, the method comprises following steps.

Step 101: sending a taxi-hailing request to a taxi-hailing server by a user equipment via a taxi-hailing app.

Taking an example where the user equipment is a mobile phone, a user starts a taxi-hailing app installed on the mobile phone via the mobile phone, enters an originating address and a destination address, and then sends the taxi-hailing request to the taxi-hailing server of a background corresponding to the taxi-hailing app via network communication, wherein the taxi-hailing request carries identification information of the user equipment. Supposing the user equipment is the mobile phone of the user, the identification information is the mobile phone number.

Step 102: group sending taxi-hailing requests, by the taxi-hailing server, to vehicle-mounted smart devices in taxies nearby the user equipment.

Supposing a taxi driver replies via the vehicle-mounted smart device to confirm that the taxi-hailing request has been received, a taxi-hailing response may be sent to the taxi-hailing server via the vehicle-mounted smart device.

Step 103: determining, by the taxi-hailing server according to an originating address and a destination address comprised in the taxi-hailing request, a vehicle driving route range between the originating address and the destination address and a reasonable time range for arriving at the destination address after receiving a taxi-hailing response fed back by the vehicle-mounted smart device.

For example, according to the originating address and the destination address entered by the user when the user hails a taxi, the taxi-hailing server positions a corresponding originating location and a destination location on an electronic map, then determines a plurality of routes (namely, the vehicle driving route range) from the originating location to the destination location on the electronic map, and then determines, according to real-time traffic information, reasonable time required for each vehicle driving route (each route from the originating location to the destination location).

It is to be noted that the taxi-hailing server stores the electronic map, in which use rules of various roads are comprised. The taxi-hailing server also may log onto a real-time traffic monitoring system to obtain the latest traffic flow information, such that the vehicle driving route range and the reasonable vehicle driving time may be more accurately calculated out.

Step 104: acquiring and sending, by the vehicle-mounted smart device, the in-vehicle image information obtained when a passenger gets on to the taxi-hailing server.

After the vehicle-mounted smart device replies to the user equipment to confirm that the taxi-hailing request has been received, in-vehicle image information is acquired when the passenger making the taxi-hailing request gets on, wherein the in-vehicle image information comprises image information on the driver's location and image information on the passenger's location.

Step 105: acquiring driving data of the vehicle by the taxi-hailing server.

Alternatively, the vehicle-mounted smart device may send the driving data of the vehicle to the taxi-hailing server either in real time or at regular intervals; or the taxi-hailing server obtains the driving data of the vehicle via a GPS, wherein the driving data of the vehicle comprise but are not limited to road driving information of the vehicle, driving direction information of the vehicle, and location information of the vehicle.

Step 106: sending the in-vehicle image acquisition instruction to the vehicle-mounted smart device when it is determined, according to the driving data of the vehicle, that a location of the vehicle has gone beyond the vehicle driving route range or that the vehicle driving time has exceeded the reasonable time range.

To avoid a false alarm, when the taxi-hailing server detects, via the GPS, that the current location of the vehicle has gone beyond the determined vehicle driving route range or the vehicle driving time has exceeded the reasonable time range, the taxi-hailing server sends the in-vehicle image acquisition instruction to the vehicle-mounted smart device to more accurately determine whether it is safe in the vehicle.

Step 107: acquiring the in-vehicle image information according to the in-vehicle image acquisition instruction and sending the same to the taxi-hailing server by the vehicle-mounted smart device.

Step 108: comparing, by the taxi-hailing server, in-vehicle image information acquired twice by the vehicle-mounted smart device; and when it is determined that a danger index has reached a preset alarm threshold, sending alarm information and the driving data of the vehicle to the safety monitoring server.

Specifically, in Step 104 the taxi-hailing server has received the in-vehicle image information acquired by the vehicle-mounted smart device when the passenger gets on, in Step 107, when an exception occurs in the vehicle driving route or the vehicle driving time, an instruction is sent such that the vehicle-mounted smart device acquires again the in-vehicle image information and compares the in-vehicle image information acquired twice.

In the embodiments of the present invention, strategies of the alarm threshold may be preset for the danger index. For example, when it is found that the driver deviates from the driver's seat and it is messy in the vehicle according to the in-vehicle image acquired for the second time, this indicates that the in-vehicle status is abnormal, namely, the danger index is higher or even reaches an alarm threshold. Or when it is found that the passenger lies in the vehicle and there is peculiar smell in the vehicle, this also indicates that the in-vehicle status is abnormal, namely, the danger index is higher or even reaches the alarm threshold. However, the strategies of the alarm threshold preset for the danger index in the present invention are not limited to these examples and may have a variety of extensions, which are not illustrated herein.

To timely prevent occurrence of a safety accident, when the taxi-hailing server determines that the danger index has reached the preset alarm threshold, the alarm information and the driving data of the vehicle may be sent to the safety monitoring server.

Step 109: performing electronic positioning and tracking on the vehicle by the safety monitoring server via an electronic map according to the alarm information and the driving data of the vehicle.

To timely prevent a safety accident, the safety monitoring server performs electronic positioning and tracking on the vehicle via the electronic map according to the alarm information and the driving data of the vehicle and notifies a traffic policeman nearby the vehicle to intercept and inspect the vehicle.

Alternatively, in the embodiments of the present invention, the safety monitoring server (or the taxi-hailing server) also may send a fuel or power cut-off instruction to the vehicle-mounted smart device, such that the vehicle-mounted smart device carries out a fuel or power cut-off control according to the fuel or power cut-off instruction. The concrete implementation may be, for example, as below: the vehicle-mounted smart device sends a pulse signal to a vehicle fuel or power locking device, starts a gasoline pump control relay and an engine main power supply control relay to cut off a fuel circuit and an electric circuit of the taxi.

The vehicle-mounted smart device of the present invention just acquires in-vehicle image information when a passenger gets on, and then sends an instruction for acquiring in-vehicle image information again to the vehicle-mounted smart device only when the taxi-hailing server determines that the danger index is higher. It is not required to acquire in-vehicle image information in real time, which neither is suspected of infringement of privacy of the passenger nor sends a great deal of image information to the taxi-hailing server, thereby greatly reducing memory stress of the taxi-hailing server.

Meanwhile, the taxi-hailing server in the present invention may calculate, according to an originating address and a destination address in a taxi-hailing request, multiple reasonable vehicle driving routes (vehicle driving route range) between the originating address and the destination address, and may also calculate a reasonable time range from the originating address to the destination address. Only when it is determined that a road where the vehicle currently is, a driving direction or a location obtained via a GPS has gone beyond the vehicle driving route range or that the vehicle driving time has exceeded the reasonable time range, i.e., only when it is determined that an in-vehicle danger index is higher, is it started again to acquire the in-vehicle image information. Thus the determination is relatively scientific and reasonable.

Further, the alarm information and the driving data of the vehicle are not sent to the safety monitoring server unless it is compared the in-vehicle image information acquired twice and it is determined that a danger index has exceeded a preset alarm threshold (for example, it may be considered that there is a high probability of occurrence of a safety accident when the in-vehicle image acquired for the first time shows that it is clean and tidy in the vehicle but the in-vehicle image acquired for the second time shows that it is messy in the vehicle) according to a comparison result, electronic positioning and tracking are performed on the vehicle via an electronic map, and a traffic policeman nearby the vehicle is notified to intercept or inspect the vehicle. Therefore, it is not easy to cause a false alarm, and thus a probability of false alarm is reduced.

Figure 2:
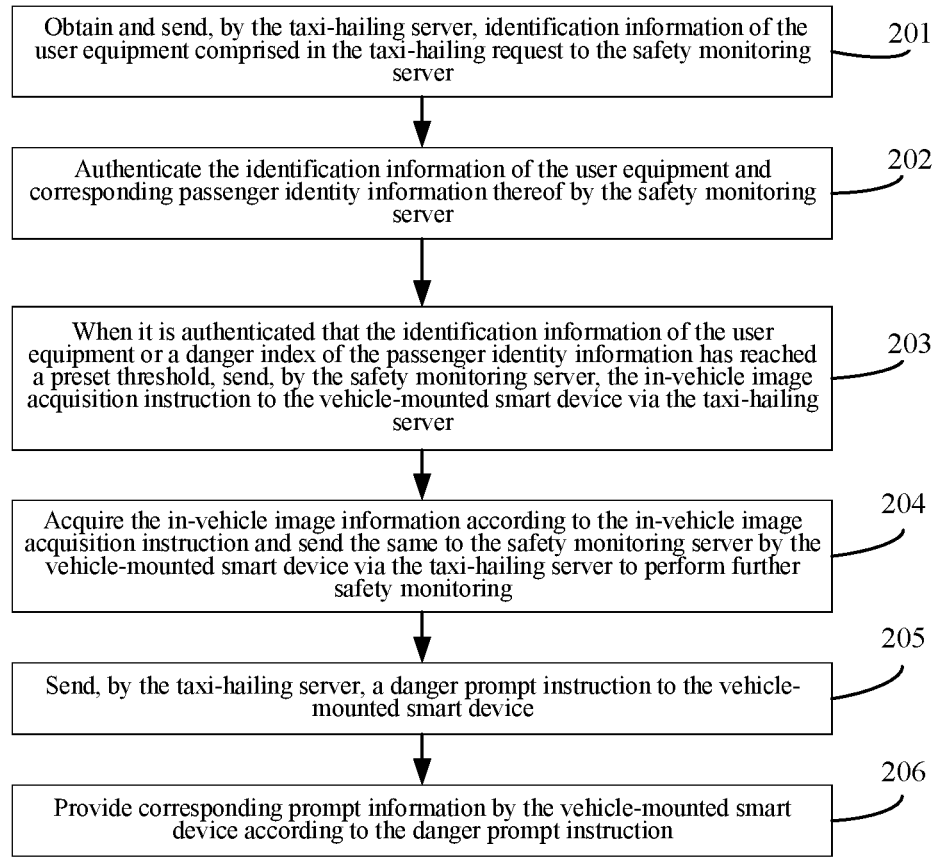
FIG. 2 is a schematic flowchart of a method for monitoring vehicle driving safety according to an embodiment of this application.

FIG. 2 is a schematic flowchart of a method for monitoring vehicle driving safety according to an embodiment of this application. As shown in FIG. 2, the method comprises following steps.

Step 201: obtaining and sending, by the taxi-hailing server, identification information of the user equipment comprised in the taxi-hailing request to the safety monitoring server.

Taking an example where the user equipment is a mobile phone, when the user makes an online car-hailing request via the mobile phone, generally the taxi-hailing request carries the mobile phone number, and the taxi-hailing server may send the mobile phone number to the safety monitoring server. It is to be explained that the safety monitoring server in the embodiments of the present invention may be a national safety monitoring server.

Step 202: authenticating the identification information of the user equipment and corresponding passenger identity information thereof by the safety monitoring server.

In the embodiments of the present invention, various strategies for authenticating the danger index of the identification of the user equipment or of the passenger identity information may be preset. For example, the mobile phone number belongs to a sensitive area, or the user information corresponding to the mobile phone number belongs to a sensitive area, or a user to whom the mobile phone number belongs frequently changes mobile phone numbers, or the mobile phone number has been used for illegal transaction, or the user to whom the mobile phone number belongs has ever been engaged in illegal activities, and so on. The safety monitoring server determines that the danger index of the identification information of the user equipment or of the passenger identity information has reached the preset monitoring threshold.

Step 203: when it is authenticated that the identification information of the user equipment or a danger index of the passenger identity information has reached a preset threshold, sending, by the safety monitoring server, the in-vehicle image acquisition instruction to the vehicle-mounted smart device via the taxi-hailing server.

Alternatively, the safety monitoring server authenticates the safety of the identification of the user equipment and corresponding user information thereof; and when it is determined that the danger index of the identification information of the user equipment or of the passenger identity information has reached the preset monitoring threshold, the safety monitoring server also may directly send the in-vehicle image acquisition instruction to the vehicle-mounted smart device.

Step 204: acquiring the in-vehicle image information according to the in-vehicle image acquisition instruction and sending the same to the safety monitoring server by the vehicle-mounted smart device via the taxi-hailing server to perform further safety monitoring.

Alternatively, the vehicle-mounted smart device also may directly send the acquired in-vehicle image information to the safety monitoring server to perform further safety monitoring.

For example, when a face image of the passenger is sent to the safety monitoring server to perform further face recognition and the passenger is recognized, via a face recognition technology, as a criminal fleeing around to commit crimes and wanted by the Ministry of Public Security, the safety monitoring server (or the taxi-hailing server) in the embodiments of the present invention also may send a fuel or power cut-off instruction to the vehicle-mounted smart device, such that the vehicle-mounted smart device carries out a fuel or power cut-off control according to the fuel or power cut-off instruction. The concrete implementation may be, for example, as below: the vehicle-mounted smart device sends a pulse signal to a vehicle fuel or power locking device, starts a gasoline pump control relay and an engine main power supply control relay to cut off a fuel circuit and an electric circuit of the taxi.

In an alternative embodiment of the present invention, the method further comprises following steps:

Step 205: sending, by the taxi-hailing server, a danger prompt instruction to the vehicle-mounted smart device; and Step 206: providing corresponding prompt information by the vehicle-mounted smart device according to the danger prompt instruction.

The prompt information comprises, for example, a vibration prompt of a safety belt in a location where a driver is.

In the embodiments of the present invention, the safety of the identification of the user equipment and corresponding user information thereof is authenticated via the safety monitoring server according to the identification (for example, a mobile phone number, which generally is subject to real-name registration) of the user equipment initiating the taxi-hailing request. When the safety monitoring server determines that the danger index of the identification information of the user equipment or of the passenger identity information has reached the preset monitoring threshold, the safety monitoring server sends the in-vehicle image acquisition instruction to the vehicle-mounted smart device, such that the vehicle-mounted smart device acquires the in-vehicle image information again according to the in-vehicle image acquisition instruction, and sends the interior image information to the safety monitoring server to perform further safety monitoring. Meanwhile, a danger vibration prompt may also be provided to the driver via the vehicle-mounted smart device, which not only can avoid false alarm of danger information but also can prevent occurrence of a safety accident in advance.

Figure 3:
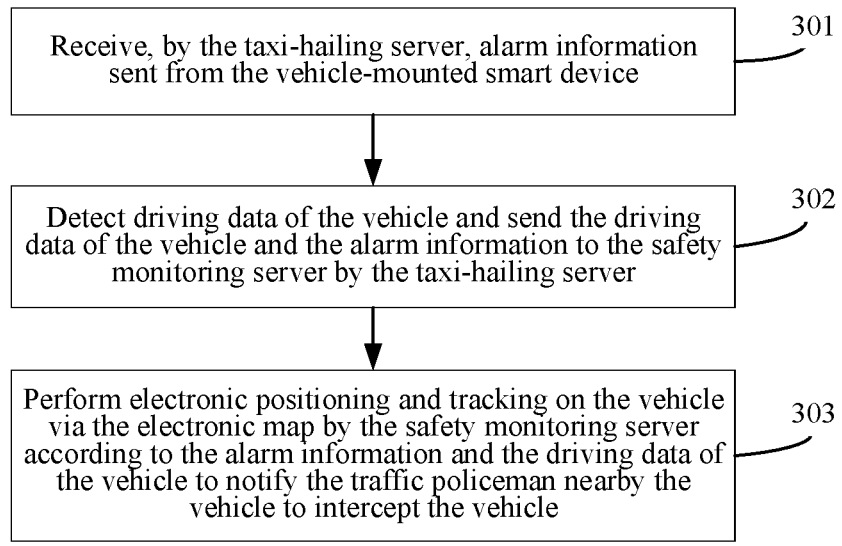
FIG. 3 is a schematic flowchart of a method for monitoring vehicle driving safety according to an embodiment of this application.

FIG. 3 is a schematic flowchart of a method for monitoring vehicle driving safety according to an embodiment of this application. As shown in FIG. 3, the method comprises following steps.

Step 301: receiving, by the taxi-hailing server, alarm information sent from the vehicle-mounted smart device.

Alternatively, the taxi-hailing server also may receive alarm information sent from the user equipment.

For example, after the passenger gets on, in case the taxi-hailing server fails to determine that the in-vehicle danger index is higher and thus an instruction for acquiring in-vehicle image information is not started again, a driver may trigger an alarm via a preset alarm button in the vehicle-mounted smart device or a passenger may trigger an alarm via a preset alarm button in a hand-held user equipment when a safety accident occurs in the vehicle, for example, the driver assaults the passenger or the passenger assaults the driver. In the embodiments of the present invention, the alarm information triggered by the vehicle-mounted smart device or the user equipment may be sent to the taxi-hailing server.

Step 302: detecting driving data of the vehicle and sending the driving data of the vehicle and the alarm information to the safety monitoring server by the taxi-hailing server; and Step 303: performing electronic positioning and tracking on the vehicle via the electronic map by the safety monitoring server according to the alarm information and the driving data of the vehicle to notify the traffic policeman nearby the vehicle to intercept the vehicle.

Alternatively, the safety monitoring server (or the taxi-hailing server) also may send a fuel or power cut-off instruction to the vehicle-mounted smart device, such that the vehicle-mounted smart device carries out a fuel or power cut-off control according to the fuel or power cut-off instruction. The concrete implementation may be, for example, as below: the vehicle-mounted smart device sends a pulse signal to a vehicle fuel or power locking device, starts a gasoline pump control relay and an engine main power supply control relay to cut off a fuel circuit and an electric circuit of the taxi.

In the embodiments of the present invention, the alarm information triggered by the vehicle-mounted smart device or the user equipment may be sent to the taxi-hailing server, and then sent to the safety monitoring server by the taxi-hailing server. Alternatively, the alarm information also may be directly sent to the safety monitoring server, such that the safety monitoring server performs electronic positioning and tracking on the vehicle via the electronic map according to the alarm information and the driving data of the vehicle and notifies the traffic policeman nearby the vehicle to intercept or inspect the vehicle. In this way, a safety accident may be timely monitored and prevented.

Figure 4:
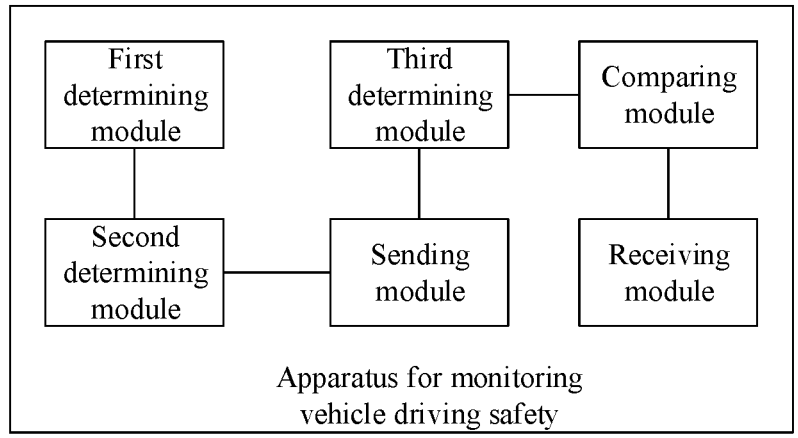
FIG. 4 is a schematic structural diagram of an apparatus for monitoring vehicle driving safety according to an embodiment of this application.

FIG. 4 is a schematic structural diagram of an apparatus for monitoring vehicle driving safety according to an embodiment of this application. The apparatus is positioned at a side of a taxi-hailing server. As shown in FIG. 4, the apparatus comprises:

a first determining module, configured to determine, according to an originating address and a destination address comprised in the taxi-hailing request, a vehicle driving route range between the originating address and the destination address and a reasonable time range for arriving at the destination address; during specific implementation, the first determining module may be implemented using a processor in the taxi-hailing server; wherein a memory of the taxi-hailing server stores an electronic map, use rules of various roads, and the obtained current traffic flow, etc.;

a second determining module, configured to determine, according to driving data of the vehicle sent from the vehicle-mounted smart device, that a location of the vehicle has gone beyond the vehicle driving route range or that the vehicle driving time has exceeded the reasonable time range; during specific implementation, the second determining module may be implemented using the processor in the taxi-hailing server;

a sending module, configured to send an in-vehicle image acquisition instruction to the vehicle-mounted smart device, such that the vehicle-mounted smart device acquires and sends in-vehicle image information to the taxi-hailing server; during specific implementation, the sending module may be, for example, a mobile communication network wireless transmission module;

a comparing module, configured to compare in-vehicle image information acquired twice according to the in-vehicle image information acquired by the vehicle-mounted smart device after responding to the taxi-hailing request and when a passenger gets on; during specific implementation, the comparing module may be implemented using the processor in the taxi-hailing server, for this purpose, various comparison strategies of the in-vehicle image information are stored in the memory of the taxi-hailing server; and a third determining module, configured to determine that a danger index has reached a preset alarm threshold according to a comparison result obtained by the comparing module, and send, via the sending module, alarm information and the driving data of the vehicle to the safety monitoring server, such that the safety monitoring server performs electronic positioning and tracking on the vehicle via the electronic map according to the alarm information and the driving data of the vehicle to notify a traffic policeman nearby the vehicle to inspect or monitor the vehicle. During specific implementation, the third determining module may be implemented using the processor in the taxi-hailing server.

The driving data of the vehicle comprise road driving information of the vehicle, driving direction information of the vehicle, and location information of the vehicle.

Alternatively, the apparatus further comprises:

a receiving module, configured to receive the taxi-hailing request sent from a user equipment, receive a taxi-hailing response, made by the vehicle-mounted smart device, to the taxi-hailing request, and receive the in-vehicle image information acquired by the vehicle-mounted smart device when the passenger gets on.

The in-vehicle image information comprises image information of a location where the passenger is and image information of a location where a driver is.

Alternatively, the sending module is further configured to send identification information of the user equipment comprised in the taxi-hailing request to the safety monitoring server to authenticate the identification information of the user equipment and corresponding passenger identity information thereof.

The sending module is further configured to send, when it is authenticated that the danger index of the identification information of the user equipment or of the passenger identity information has reached a preset threshold, the in-vehicle image acquisition instruction to the vehicle-mounted smart device, such that the vehicle-mounted smart device acquires the in-vehicle image information according to the in-vehicle image acquisition instruction and sends the in-vehicle image to the safety monitoring server to perform further safety monitoring.

The sending module is further configured to send a danger prompt instruction to the vehicle-mounted smart device, such that the vehicle-mounted smart device provides corresponding prompt information according to the danger prompt instruction, the prompt information comprising a vibration prompt of a safety belt in a location where a driver is.

The receiving module is further configured to receive the alarm information sent from the vehicle-mounted smart device or the user equipment and the driving data of the vehicle, and send the alarm information and the driving data of the vehicle to the safety monitoring server, such that the safety monitoring server performs electronic positioning and tracking on the vehicle via the electronic map according to the alarm information and the driving data of the vehicle to notify the traffic policeman nearby the vehicle to intercept the vehicle.

Figure 5:
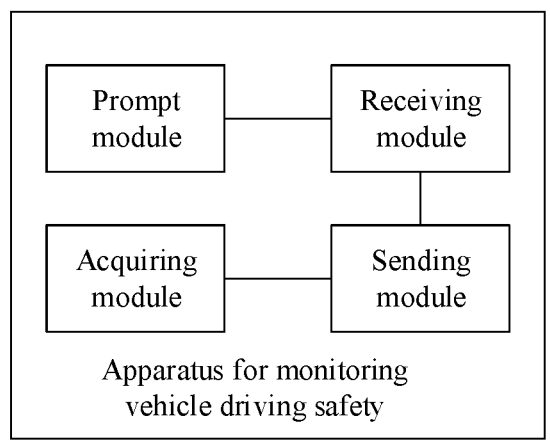
FIG. 5 is a schematic structural diagram of an apparatus for monitoring vehicle driving safety according to an embodiment of this application.

FIG. 5 is a schematic structural diagram of an apparatus for monitoring vehicle driving safety according to an embodiment of this application. The apparatus is positioned at a side of the vehicle-mounted smart device. As shown in FIG. 5, the apparatus comprises:

a sending module, configured to send, after making a taxi-hailing response to a taxi-hailing request sent from the user equipment, the taxi-hailing response to the taxi-hailing server; wherein the sending module may be, for example, a mobile communication network wireless transmission module; and an acquiring module, configured to acquire in-vehicle image information, obtained when a passenger gets on, corresponding to the taxi-hailing request, and send, via the sending module, the in-vehicle image information to the taxi-hailing server. The in-vehicle image information comprises image information of a location where a driver is and image information of a location where the passenger is. During specific implementation, the acquiring module may be various sensors, cameras, voice recording apparatuses, and so on.

The acquiring module is further configured to acquire and send driving data of the vehicle to the taxi-hailing server. The driving data of the vehicle comprise road driving information of the vehicle, driving direction information of the vehicle, and location information of the vehicle. The acquiring module herein may further comprise a GPS module.

In this way, the taxi-hailing server determines, according to an originating address and a destination address comprised in the taxi-hailing request, a vehicle driving route range between the originating address and the destination address and a reasonable time range for arriving at the destination address. When it is determined that a location of the vehicle has gone beyond the vehicle driving route range or that the vehicle driving time has exceeded the reasonable time range according to the driving data of the vehicle sent from the vehicle-mounted smart device, an in-vehicle image acquisition instruction is sent to the vehicle-mounted smart device.

The acquiring module is further configured to acquire the in-vehicle image information according to the in-vehicle image acquisition instruction and send the same to the taxi-hailing server, such that the taxi-hailing server compares in-vehicle image information acquired twice. When it is determined that a danger index has reached a preset alarm threshold according to a comparison result, alarm information and the driving data of the vehicle are sent to the safety monitoring server, such that the safety monitoring server performs electronic positioning and tracking on the vehicle via an electronic map according to the alarm information and the driving data of the vehicle to notify a traffic policeman nearby the vehicle to inspect or monitor the vehicle.

Alternatively, the apparatus further comprises:
a receiving module, configured to receive a danger prompt instruction sent from the taxi-hailing server; and
a prompt module, configured to provide corresponding prompt information according to the danger prompt instruction, the prompt information comprising a vibration prompt of a safety belt in a location where a driver is. During concrete implementation, the prompt module herein may be implemented by the processor of the vehicle-mounted smart device.

After the taxi-hailing server obtains identification information of the user equipment comprised in the taxi-hailing request, the identification information of the user equipment is sent to the safety monitoring server to authenticate the identification information of the user equipment and corresponding passenger identity information thereof, and an instruction is sent to the vehicle-mounted smart device when it is authenticated that the danger index of the identification information of the user equipment or of the passenger identity information has reached a preset threshold, the instruction being the danger prompt instruction.

Alternatively, the sending module is further configured to send, when an operation for an alarm button is detected, the alarm information and the driving data of the vehicle to the taxi-hailing server, such that the taxi-hailing server sends the alarm information and the driving data of the vehicle to the safety monitoring server, and that the safety monitoring server performs electronic positioning and tracking on the vehicle via the electronic map according to the alarm information and the driving data of the vehicle to notify the traffic policeman nearby the vehicle to intercept the vehicle.

The apparatus as shown in FIG. 4 and FIG. 5 may perform the method according to any one of the embodiments in FIG. 1-FIG. 3, and the implementation principles and technical effects thereof are omitted.

Figure 6:
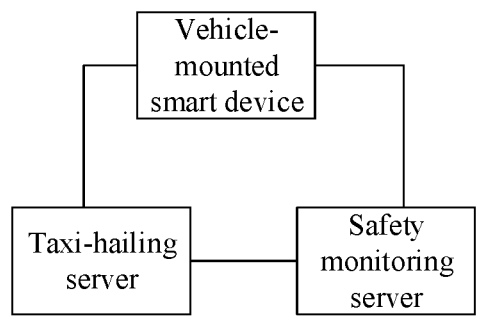
FIG. 6 is a schematic structural diagram of a system for monitoring vehicle driving safety according to an embodiment of this application.

FIG. 6 is a schematic structural diagram of a system for monitoring vehicle driving safety according to an embodiment of this application. As show in FIG. 6, the system comprises: a taxi-hailing server, a vehicle-mounted smart device, and a safety monitoring server. The taxi-hailing server, the vehicle-mounted smart device and the safety monitoring server may be wirelessly connected via, for example, a mobile communication network.

The taxi-hailing server comprises the apparatus for monitoring vehicle driving safety according to the embodiment as shown in FIG. 4.

The vehicle-mounted smart device comprises the apparatus for monitoring vehicle driving safety according to the embodiment as shown in FIG. 5.

The safety monitoring server is configured to receive the alarm information and the driving data of the vehicle sent from the taxi-hailing server, and perform electronic positioning and tracking on the vehicle via the electronic map according to the alarm information and the driving data of the vehicle to notify the traffic policeman nearby the vehicle to inspect or monitor the vehicle.

Alternatively, the safety monitoring server is further configured to receive identification information of the user equipment comprised in the taxi-hailing request sent from the taxi-hailing server, authenticate the identification information of the user equipment and the corresponding passenger identity information thereof, send an in-vehicle image acquisition instruction to the vehicle-mounted smart device via the taxi-hailing server when it is authenticated that the danger index of the identification information of the user equipment or of the passenger identity information has reached a preset threshold, or directly send the in-vehicle image acquisition instruction to the vehicle-mounted smart device, such that the vehicle-mounted smart device acquires the in-vehicle image information according to the in-vehicle image acquisition instruction and sends the in-vehicle image to the safety monitoring server to perform further safety monitoring.

Alternatively, the safety monitoring server is further configured to send a danger prompt instruction to the vehicle-mounted smart device via the taxi-hailing server when it is authenticated that the danger index of the identification information of the user equipment or of the passenger identity information has reached a preset threshold, or directly send the danger prompt instruction to the vehicle-mounted smart device, such that the vehicle-mounted smart device provides corresponding prompt information according to the danger prompt instruction, the prompt information comprising a vibration prompt of a safety belt in a location where a driver is.

Alternatively, the safety monitoring server is further configured to receive the alarm information sent from the vehicle-mounted smart device or the user equipment, obtain the driving data of the vehicle, and perform electronic positioning and tracking on the vehicle via the electronic map according to the alarm information and the driving data of the vehicle to notify the traffic policeman nearby the vehicle to intercept the vehicle.

The system as shown in FIG. 6 may perform the method according to any one of the embodiments in FIG. 1-FIG. 3, and the implementation principles and technical effects thereof are omitted.

Each of parts according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the parts in the apparatus and system for monitoring vehicle driving safety according to the embodiments of the present invention. The present invention may further be implemented as equipment or device program (for example, computer program and computer program product) for executing some or all of the methods as described herein. Such program for implementing the present invention may be stored in the computer readable medium, or have a form of one or more signals. Such a signal may be downloaded from the Internet websites, or be provided on a carrier signal, or provided in any other form.

Figure 7:
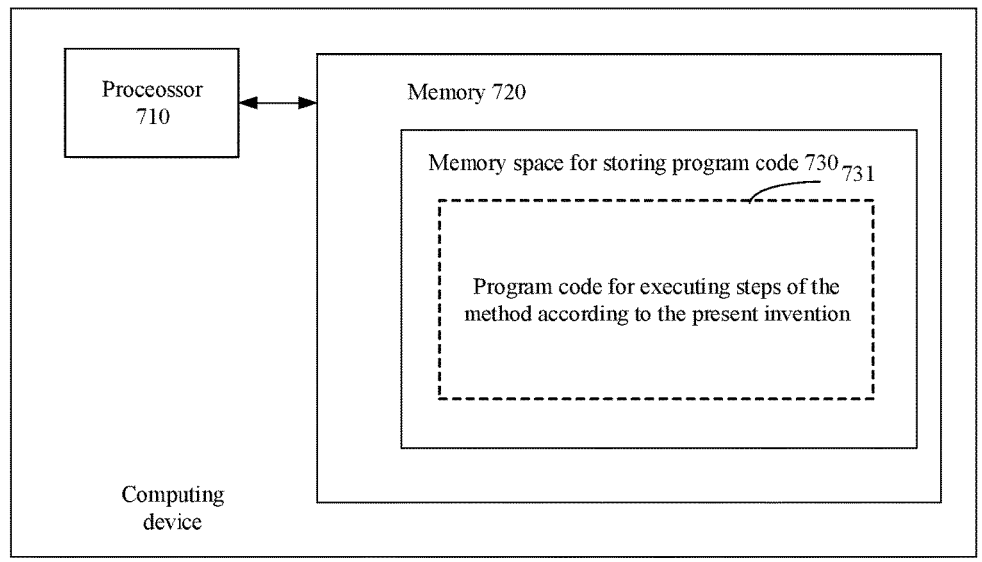
FIG. 7 schematically illustrates a block diagram of a computing device for performing the method according to the present invention.
Figure 8:
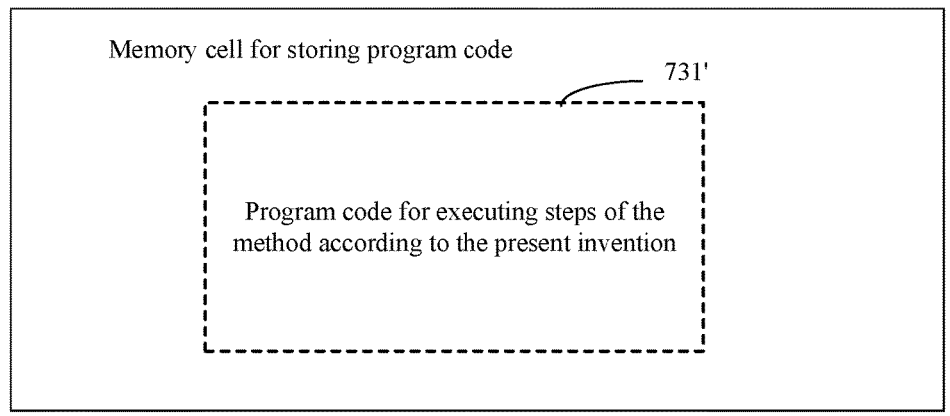
FIG. 8 schematically illustrates a storage unit for maintaining or carrying a program code for implementing the method according to the present invention.

For example, FIG. 7 schematically illustrates a block diagram of a computing device for performing the method according to the present invention. Traditionally, the computer device includes a processor 710 and a computer program product or a computer readable medium in form of a memory 720. The memory 720 may be electronic memories such as flash memory, EEPROM (Electrically Erasable Programmable Read-Only Memory), EPROM, hard disk or ROM. The memory 720 has a memory space 730 for executing program codes 731 of any steps in the above methods. For example, the memory space 730 for program codes may comprise respective program codes 731 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 8. The memory cells may be provided with memory sections, memory spaces, etc., similar to the memory 720 of the computer device as shown in FIG. 7. The program codes may be compressed for example in an appropriate form. Usually, the memory cell includes computer readable codes 731' used for performing the steps of the method according to the present invention, namely, codes which can be read for example by the processor 710. When these codes are operated on the computing device, the computing device is caused to execute respective steps in the method as described above.

"One embodiment", "embodiments" or "one or more embodiments" herein means that particular features, structures or characteristics described in combination with the embodiments are included at least one embodiment of the present invention. Furthermore, it is to be noted that the term "in one embodiment" herein does not necessarily refers to the same embodiment.

Many details are discussed in the specification provided herein. However, it should be understood that the embodiments of the present invention can be implemented without these specific details. In some examples, the well-known methods, structures and technologies are not shown in detail so as to avoid an unclear understanding of the description.

It should be noted that the above-described embodiments are intended to illustrate but not to limit the present invention, and alternative embodiments can be devised by a person skilled in the art without departing from the scope of claims as appended. In the claims, no reference mark between round brackets shall impose restriction on the claims. The word "comprise" does not exclude a component or step not listed in the claims. The wording "a" or "an" in front of an element does not exclude the presence of a plurality of such elements. The present invention may be realized by way of hardware comprising a number of different components and by way of a suitably programmed computer. In the unit claim listing a plurality of devices, some of these devices may be embodied in the same hardware. The wordings "first", "second", and "third", etc. do not denote any order. These wordings can be construed as naming.

Also, it should be noticed that the language used in the present specification is chosen for the purpose of readability and teaching, rather than explaining or defining the subject matter of the present invention. Therefore, it is apparent to an ordinary skilled person in the art that modifications and variations could be made without departing from the scope and spirit of the claims as appended. For the scope of the present invention, the publication of the present invention is illustrative rather than restrictive, and the scope of the present invention is defined by the appended claims. The above description illustrates and depicts a plurality of preferred embodiments of the present invention. However, as previously mentioned, it should be understood that the present invention is not limited to the forms disclosed herein, should not be regarded as excluding other embodiments, but may be used for various other combinations, modifications and environments, and can be altered through the above indoctrination or technology or knowledge in related art within the scope of inventive conception herein. Alterations and changes made by those skilled in the art do not depart from the spirit and scope of the present invention, and should be within the scope of protection of the appended claims of the present invention.

What is claimed is:

1. A method for monitoring vehicle driving safety, comprising:
    determining, by a taxi-hailing server according to an originating address and a destination address comprised in a taxi-hailing request, a vehicle driving route range between the originating address and the destination address and a reasonable time range for arriving at the destination address;
    when it is determined that a location of the vehicle has gone beyond the vehicle driving route range or that the vehicle driving time has exceeded the reasonable time range according to driving data of the vehicle sent from a vehicle-mounted smart device, sending an in-vehicle image acquisition instruction to the vehicle-mounted smart device, such that the vehicle-mounted smart device acquires and sends in-vehicle image information to the taxi-hailing server;
    comparing in-vehicle image information acquired twice according to the in-vehicle image information acquired by the vehicle-mounted smart device after responding to the taxi-hailing request and when a passenger gets on; and
    when it is determined that a danger index has reached a preset alarm threshold according to a comparison result, sending alarm information and the driving data of the vehicle to a safety monitoring server, such that the safety monitoring server performs electronic positioning and tracking on the vehicle via an electronic map according to the alarm information and the driving data of the vehicle to notify a traffic policeman nearby the vehicle to monitor the vehicle.

2. The method according to claim 1, wherein
    the driving data of the vehicle comprise road driving information of the vehicle, driving direction information of the vehicle, and location information of the vehicle.

3. The method according to claim 1, further comprising:
    receiving, by the taxi-hailing server, the taxi-hailing request sent from a user equipment; receiving, by the taxi-hailing server, a taxi-hailing response, made by the vehicle-mounted smart device, to the taxi-hailing request; and receiving, by the taxi-hailing server, the in-vehicle image information acquired by the vehicle-mounted smart device when the passenger gets on; wherein the in-vehicle image information comprises image information of a location where the passenger is and image information of a location where a driver is.

4. The method according to claim 3, wherein after the taxi-hailing server receives the taxi-hailing request sent from the user equipment, the method further comprises:

obtaining, by the taxi-hailing server, identification information of the user equipment comprised in the taxi-hailing request, and sending the identification information of the user equipment to the safety monitoring server to authenticate the identification information of the user equipment and corresponding passenger identity information thereof; and when it is authenticated that the danger index of the identification information of the user equipment or of the passenger identity information has reached a preset threshold, sending the in-vehicle image acquisition instruction to the vehicle-mounted smart device, such that the vehicle-mounted smart device acquires the in-vehicle image information according to the in-vehicle image acquisition instruction and sends the in-vehicle image to the safety monitoring server to perform further safety monitoring.

5. The method according to claim 4, wherein when it is authenticated that the danger index of the identification information of the user equipment or of the passenger identity information has reached a preset threshold, the method further comprises:

sending, by the taxi-hailing server, a danger prompt instruction to the vehicle-mounted smart device, such that the vehicle-mounted smart device provides corresponding prompt information according to the danger prompt instruction, the prompt information comprising a vibration prompt of a safety belt in a location where a driver is.

6. The method according to claim 3, further comprising:

receiving, by the taxi-hailing server, the alarm information sent from the vehicle-mounted smart device or the user equipment, obtaining the driving data of the vehicle, and sending the alarm information and the driving data of the vehicle to the safety monitoring server, such that the safety monitoring server performs electronic positioning and tracking on the vehicle via the electronic map according to the alarm information and the driving data of the vehicle to notify the traffic policeman nearby the vehicle to intercept the vehicle.

7. A computing device, positioned at a side of a taxi-hailing server, and comprising:

a memory having instructions stored thereon;

a processor configured to execute the instructions to perform operations for monitoring vehicle driving safety, the operations comprising:

determining, according to an originating address and a destination address comprised in a taxi-hailing request, a vehicle driving route range between the originating address and the destination address and a reasonable time range for arriving at the destination address;

determining, according to driving data of the vehicle sent from a vehicle-mounted smart device, that a location of the vehicle has gone beyond the vehicle driving route range or that the vehicle driving time has exceeded the reasonable time range;

sending an in-vehicle image acquisition instruction to the vehicle-mounted smart device, such that the vehicle-mounted smart device acquires and sends in-vehicle image information to the taxi-hailing server;

comparing in-vehicle image information acquired twice according to the in-vehicle image information acquired by the vehicle-mounted smart device after responding to the taxi-hailing request and when a passenger gets on; and determining that a danger index has reached a preset alarm threshold according to a comparison result, and sending alarm information and the driving data of the vehicle to a safety monitoring server, such that the safety monitoring server performs electronic positioning and tracking on the vehicle via an electronic map according to the alarm information and the driving data of the vehicle to notify a traffic policeman nearby the vehicle to inspect or monitor the vehicle.

8. The computing device according to claim 7, wherein the driving data of the vehicle comprise road driving information of the vehicle, driving direction information of the vehicle, and location information of the vehicle.

9. The computing device according to claim 7, the operations further comprising:

receiving the taxi-hailing request sent from a user equipment, receiving a taxi-hailing response, made by the vehicle-mounted smart device, to the taxi-hailing request, and receiving the in-vehicle image information acquired by the vehicle-mounted smart device when the passenger gets on; wherein the in-vehicle image information comprises image information of a location where the passenger is and image information of a location where a driver is.

10. The computing device according to claim 9, wherein sending an in-vehicle image acquisition instruction to the vehicle-mounted smart device, such that the vehicle-mounted smart device acquires and sends in-vehicle image information to the taxi-hailing server comprises:

sending identification information of the user equipment comprised in the taxi-hailing request to the safety monitoring server to authenticate the identification information of the user equipment and corresponding passenger identity information thereof; and sending, when it is authenticated that the danger index of the identification information of the user equipment or of the passenger identity information has reached a preset threshold, the in-vehicle image acquisition instruction to the vehicle-mounted smart device, such that the vehicle-mounted smart device acquires the in-vehicle image information according to the in-vehicle image acquisition instruction and sends the in-vehicle image to the safety monitoring server to perform further safety monitoring.

11. The computing device according to claim 7, wherein when it is authenticated that the danger index of the identification information of the user equipment or of the passenger identity information has reached a preset threshold, the operations further comprise:

sending a danger prompt instruction to the vehicle-mounted smart device, such that the vehicle-mounted smart device provides corresponding prompt information according to the danger prompt instruction, the prompt information comprising a vibration prompt of a safety belt in a location where a driver is.

12. The computing device according to claim 9, wherein the operations further comprise: receiving the alarm information sent from the vehicle-mounted smart device or the user equipment and the driving data of the vehicle, and sending the alarm information and the driving data of the vehicle to the safety monitoring server, such that the safety monitoring server performs electronic positioning and tracking on the vehicle via the electronic map according to the alarm information and the driving data of the vehicle to notify the traffic policeman nearby the vehicle to intercept the vehicle.

13. A system for monitoring vehicle driving safety, comprising: a taxi-hailing server, a vehicle-mounted smart device, and a safety monitoring server;
wherein the taxi-hailing server comprises an apparatus configured to:
determine, according to an originating address and a destination address comprised in a taxi-hailing request, a vehicle driving route range between the originating address and the destination address and a reasonable time range for arriving at the destination address;
determine, according to driving data of the vehicle sent from a vehicle-mounted smart device, that a location of the vehicle has gone beyond the vehicle driving route range or that the vehicle driving time has exceeded the reasonable time range;
send an in-vehicle image acquisition instruction to the vehicle-mounted smart device, such that the vehicle-mounted smart device acquires and sends in-vehicle image information to the taxi-hailing server;
compare in-vehicle image information acquired twice according to the in-vehicle image information acquired by the vehicle-mounted smart device after responding to the taxi-hailing request and when a passenger gets on; and
determine that a danger index has reached a preset alarm threshold according to a comparison result, and sending, alarm information and the driving data of the vehicle to a safety monitoring server, such that the safety monitoring server performs electronic positioning and tracking on the vehicle via an electronic map according to the alarm information and the driving data of the vehicle to notify a traffic policeman nearby the vehicle to inspect or monitor the vehicle;
wherein the vehicle-mounted smart device comprises the apparatus configured to:
after making a taxi-hailing response to a taxi-hailing request sent from a user equipment, send the taxi-hailing response to a taxi-hailing server;
acquire in-vehicle image information, obtained when a passenger gets on, corresponding to the taxi-hailing request, and sending the in-vehicle image information to the taxi-hailing server, the in-vehicle image information comprising image information of a location where a driver is and image information of a location where the passenger is;
acquire and send driving data of the vehicle to the taxi-hailing server, the driving data of the vehicle comprising road driving information of the vehicle, driving direction information of the vehicle, and location information of the vehicle,
such that the taxi-hailing server determines, according to an originating address and a destination address comprised in the taxi-hailing request, a vehicle driving route range between the originating address and the destination address and a reasonable time range for arriving at the destination address; and sending, when it is determined that a location of the vehicle has gone beyond the vehicle driving route range or that the vehicle driving time has exceeded the reasonable time range according to the driving data of the vehicle sent from the vehicle-mounted smart device, an in-vehicle image acquisition instruction to the vehicle-mounted smart device;
acquire the in-vehicle image information according to the in-vehicle image acquisition instruction and sending the same to the taxi-hailing server, such that the taxi-hailing server compares in-vehicle image information acquired twice; and
when it is determined that a danger index has reached a preset alarm threshold according to a comparison result, sending alarm information and the driving data of the vehicle to the a safety monitoring server, such that the safety monitoring server performs electronic positioning and tracking on the vehicle via an electronic map according to the alarm information and the driving data of the vehicle to notify a traffic policeman nearby the vehicle to monitor the vehicle;
and
wherein the safety monitoring server is configured to receive the alarm information and the driving data of the vehicle sent from the taxi-hailing server, and perform electronic positioning and tracking on the vehicle via the electronic map according to the alarm information and the driving data of the vehicle to notify the traffic policeman nearby the vehicle to inspect or monitor the vehicle.

14. The system according to claim 13, wherein
the safety monitoring server is further configured to receive identification information of the user equipment comprised in the taxi-hailing request sent from the taxi-hailing server, authenticate the identification information of the user equipment and the corresponding passenger identity information thereof, send an in-vehicle image acquisition instruction to the vehicle-mounted smart device via the taxi-hailing server when it is authenticated that the danger index of the identification information of the user equipment or of the passenger identity information has reached a preset threshold, or directly send the in-vehicle image acquisition instruction to the vehicle-mounted smart device, such that the vehicle-mounted smart device acquires the in-vehicle image information according to the in-vehicle image acquisition instruction and sends the in-vehicle image to the safety monitoring server to perform further safety monitoring.

15. The system according to claim 14, wherein
the safety monitoring server is further configured to send a danger prompt instruction to the vehicle-mounted smart device via the taxi-hailing server when it is authenticated that the danger index of the identification information of the user equipment or of the passenger identity information has reached a preset threshold, or directly send the danger prompt instruction to the vehicle-mounted smart device, such that the vehicle-mounted smart device provides corresponding prompt information according to the danger prompt instruction, the prompt information comprising a vibration prompt of a safety belt in a location where a driver is.

16. The system according to claim 13, wherein
the safety monitoring server is further configured to receive the alarm information sent from the vehicle-mounted smart device or the user equipment, obtain the driving data of the vehicle, and perform electronic positioning and tracking on the vehicle via the electronic map according to the alarm information and the driving data of the vehicle to notify the traffic policeman nearby the vehicle to intercept the vehicle.

* * * * *